United States Patent [19]

Burns

[11] Patent Number: 4,624,467
[45] Date of Patent: Nov. 25, 1986

[54] FOLDABLE UTILITY CART
[76] Inventor: Richard H. Burns, 662 Clarendon Rd., Troy, Ohio 45373
[21] Appl. No.: 788,323
[22] Filed: Oct. 17, 1985
[51] Int. Cl.$^4$ ............................................. B62B 1/12
[52] U.S. Cl. ................................... 280/40; 280/652; 280/656; 280/47.18; 280/47.37 R
[58] Field of Search ................ 280/40, 646, 652, 653, 280/654, 656, 47.26, 47.18, 47.37 R, 38, 39, 639

[56] References Cited

U.S. PATENT DOCUMENTS

| | | | |
|---|---|---|---|
| 908,472 | 1/1909 | Lyons | 280/40 |
| 1,128,333 | 2/1915 | Krna | 280/40 |
| 2,469,506 | 5/1949 | Kerr et al. | 280/40 |
| 2,657,069 | 10/1953 | Quist | 280/40 |
| 2,767,996 | 10/1956 | Seyforth | 280/40 |
| 2,879,072 | 3/1959 | Rear et al. | 280/40 |
| 2,970,846 | 2/1961 | Boston | 280/40 |
| 3,931,985 | 1/1976 | Knebel | D34/24 X |
| 4,175,768 | 11/1979 | Thackray | 280/652 |
| 4,253,677 | 3/1981 | Wissler | 280/40 |
| 4,522,425 | 6/1985 | Cornwall et al. | 280/656 |

OTHER PUBLICATIONS

Foldit Cart Sales Brochure, 2 pages, undated.

Primary Examiner—John J. Love
Assistant Examiner—Michael Mar
Attorney, Agent, or Firm—John R. Flanagan

[57] ABSTRACT

An improved foldable utility cart has a hauling body formed by a floor and a pair of opposite wheel-bearing side panels, and a handle assembly mounted to the side panels, adapting the hauling body for manually-powered push or pulling type of locomotion. Pivot plates fixed at opposite ends of the floor mount the side panels for pivotal movement between erected transport positions in which the side panels together with the floor form a load supporting cavity in the body and mobilize the body and a folded storage position in which the side panels overlie the floor so as to eliminate teh cavity and immobilize the body for storage. Each side panel has a wall member and a longitudinal tube connected along the exterior of the wall member adjacent to its lower longitudinal edge. The tube has opposite ends at which it and thus the side panel is mounted to the floor pivot plates located outside of the load supporting cavity. Also, upturned opposite side edges of the floor snugly fit against the side panel wall members when the side panels are in their erected positions to form closed longitudinal corners in the load supporting cavity. Also, a latching mechanism is disposed outside of the cavity below the floor and adjacent each wheel on one of the side panels. Each wheel is rotatably mounted by an axle to its side panel outside of the cavity. An inner end of the axle underlies the floor and is engaged and locked in place by the latching mechanism when the side panel has been pivoted to its erected transport position. By actuating each of the latching mechanisms to disengage from the respective inner ends of the wheel axles, the side panels and wheels mounted thereto can be pivoted to their folded storage positions.

13 Claims, 17 Drawing Figures

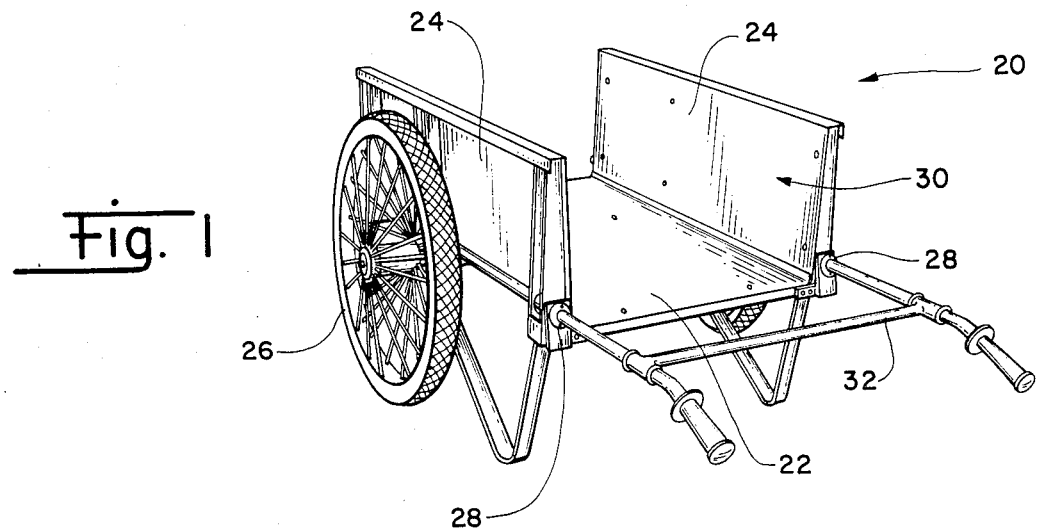
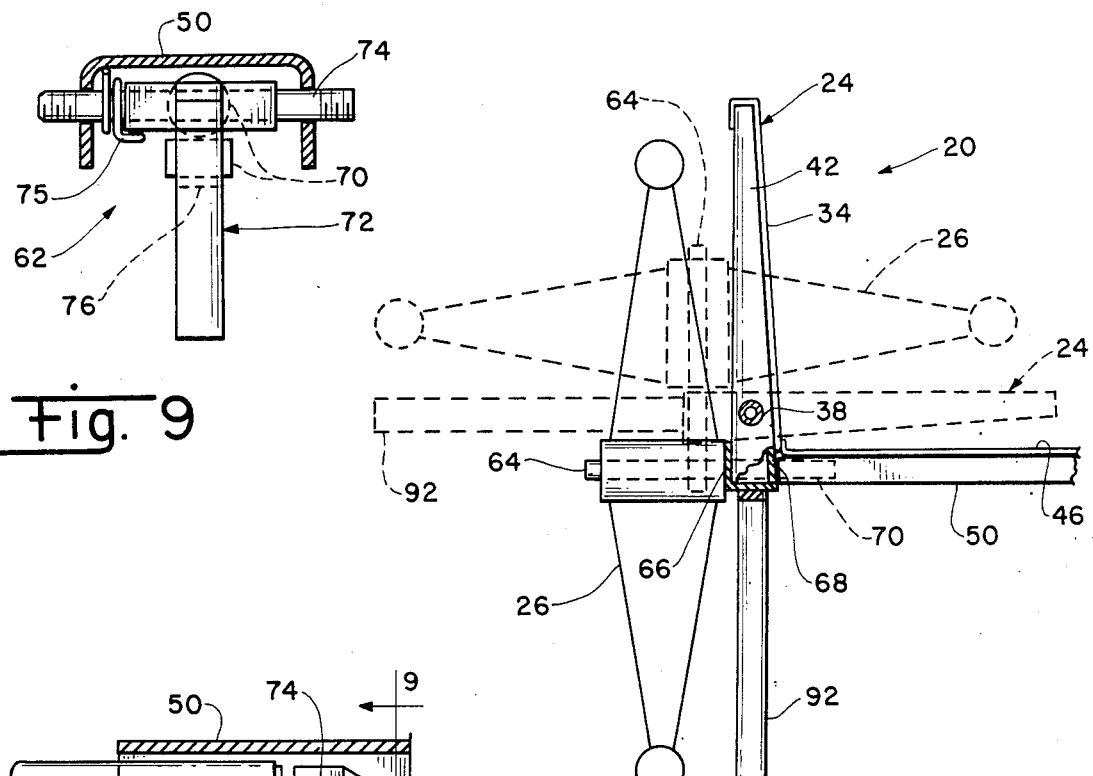

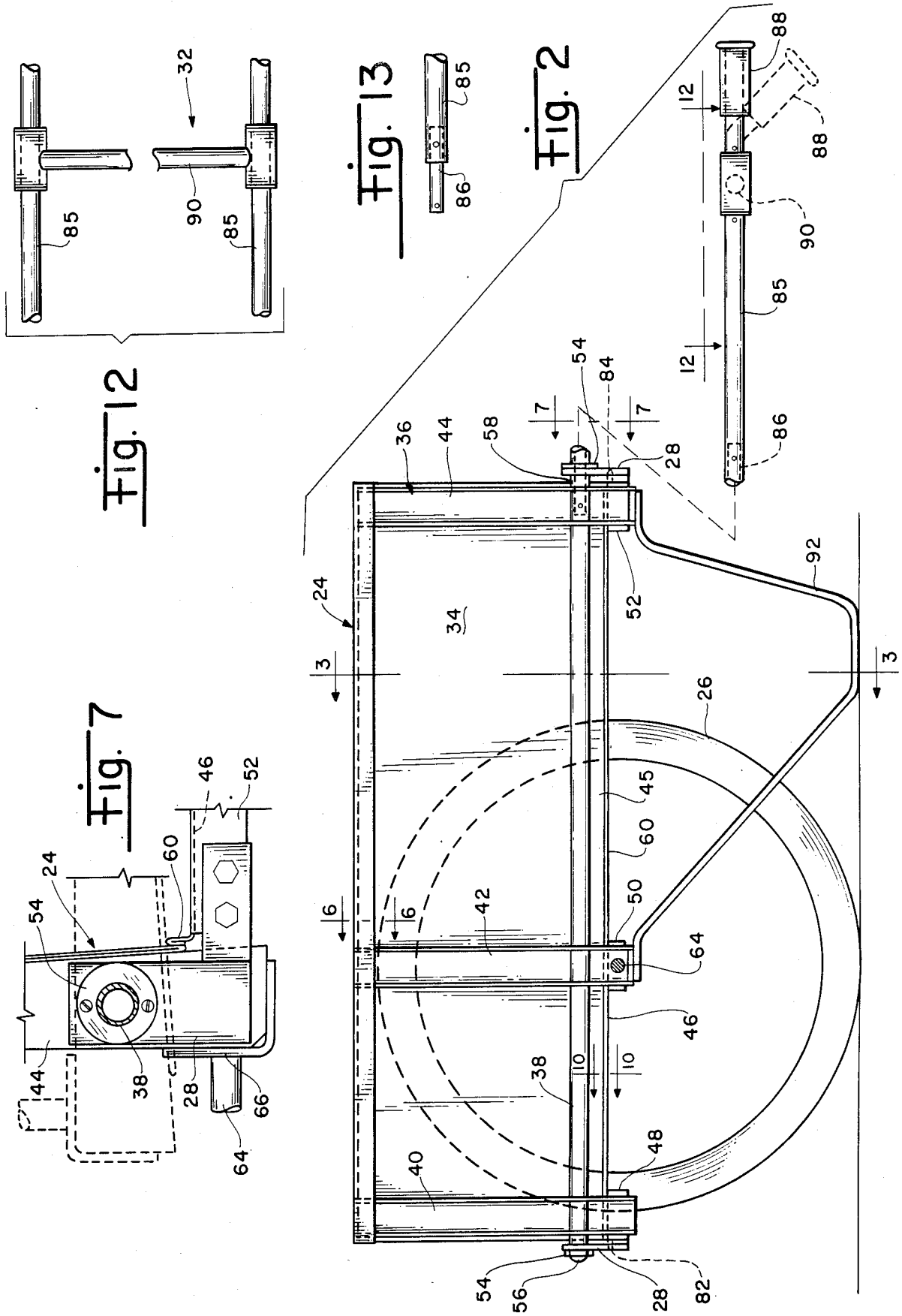

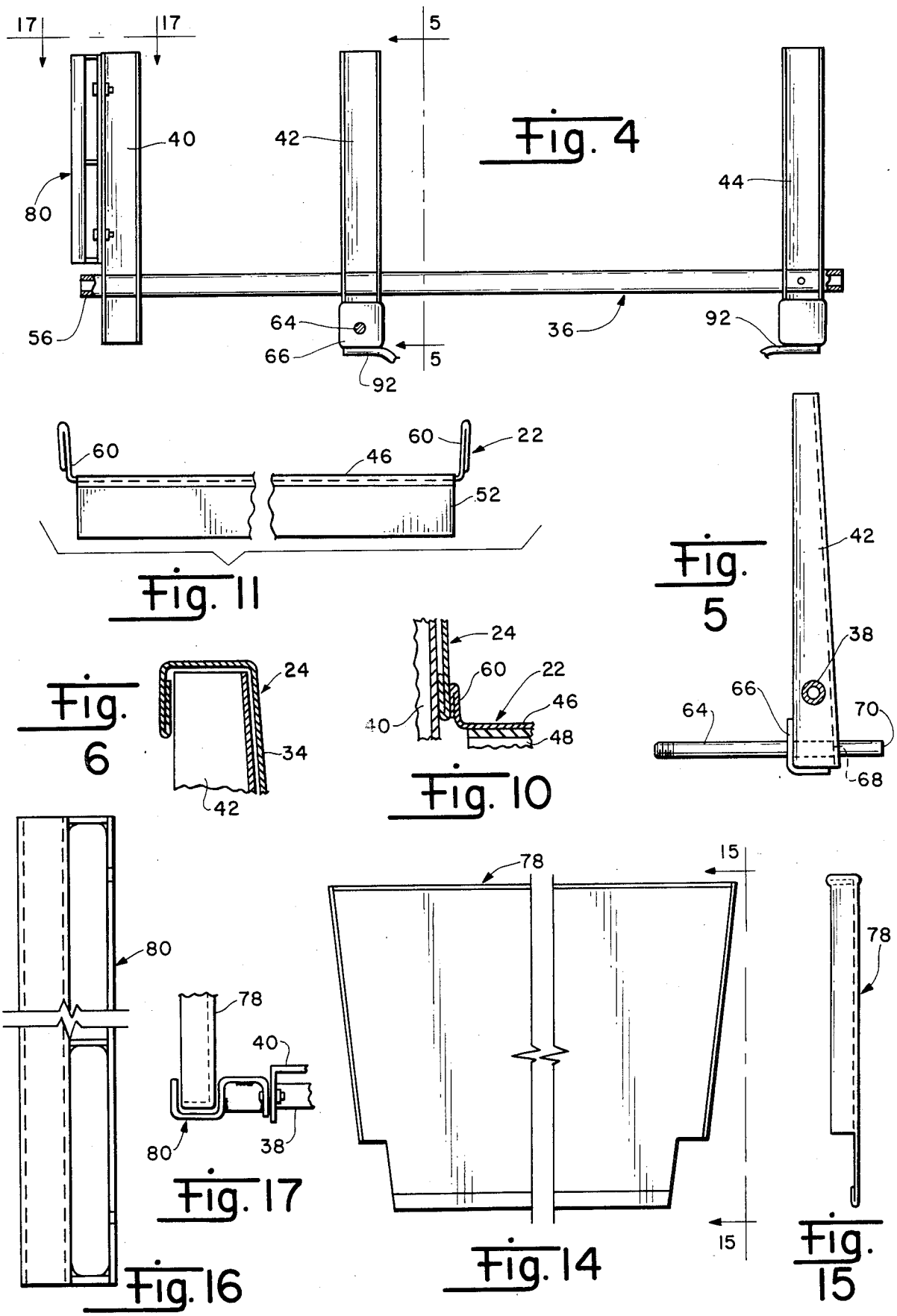

FOLDABLE UTILITY CART

BACKGROUND OF THE INVENTION

1. Field of the Invention

The present invention generally relates to multi-purpose wheeled utility vehicles and, more particularly, is concerned with a utility cart in which each opposite side panel and wheel combination as a unit is erectible to a transport position without employment of end gates and foldable to a storage position over the bottom of the cart.

2. Description of the Prior Art

Lawn and garden work and general maintenance activities of the average homeowner frequently requires the use of a multipurpose manually-powered utility vehicle for hauling a variety of things. Over the years the ordinary wheelbarrow, with its shallow flared box supported by a single front wheel and two back legs, has served this function well. However, in the past decade or so there has been a trend toward use of the utility cart, with its deeper rectangular box supported by a pair of side wheels and back legs, as a substitute for or at least a supplement to the wheelbarrow.

Notwithstanding this growing recognition of the two-wheeled utility cart's superiority over the wheelbarrow as the more versatile hauling vehicle, the same major drawback that has plagued the wheelbarrow for years has dampen the acceptability of the utility cart as a viable alternative to the wheelbarrow. That drawback is the substantial amount of space required by the cart for storage when not in use. Most of the storage space in residential garages and yard sheds is occupied already by higher priority items such as the automobile, lawn mower, snow blower, bicycle, tricycle, and lawn and garden tools. Therefore, the homeowner's decision of whether to purchase a utility cart might very likely hinge on whether enough storage space remains unused.

One approach to easing the homeowner's dilemma is to make the utility cart collapsible or foldable so that when not in use it can be stored in a smaller space. Many different collapsible or foldable carts, trailers or other types of wheeled vehicles appear in the prior art. Representative of the prior patent art are the two-wheeled vehicles disclosed in Wissler U.S. Pat. No. 4,253,677, Rear et al U.S. Pat. No. 2,879,072, Kerr et al U.S. Pat. No. 2,469,506, Krna U.S. Pat. No. 1,128,333, Lyons U.S. Pat. No. 908,472, Boston U.S. Pat. No. 2,970,846, Seyforth U.S. Pat No. 2,767,996 and Quist U.S. Pat. No. 2,657,069.

Of all of the above prior art constructions, only the Wissler folding utility cart appears to have some promise as a solution to the storage space problem. However, even it seems to embody several limitations which make it less than an optimum solution to the dual problem of providing a construction which is foldable in a simple and easy way and to a size requiring minimum storage space, yet embodies sufficient structural integrity to ensure reliability during use and durability over time.

Specifically, one limitation in the Wissler utility cart is that the lower edges of its side wall panels are pivotally connected by hinges to opposite longitudinal side edges of its floor panel for folding each respective side panel and wheel combination as a unit between an erected vertical position and a stored prone position atop the floor panel. It will be observed that the hinges are exposed to the interior of the cart box formed by the side, front and rear wall panels and thus will tend to trap and accumulate dirt and other matter being hauled in the cart as well as moisture which will tend to corrode the hinge surfaces and adversely affect their operation and durability over time. Further, this particular location of the hinged connection inherently leaves space along each side of the floor panel between it and the side wall panels through which matter, such as dirt, sand and fertilizer, can escape as it is being loaded and hauled in the cart.

Still another limitation of the Wissler utility cart seems to be the arrangement used to mount the side wheels to the respective side wall panels, in particular, by a nut welded to the side wall panel which receives a wheel mounting bolt. If the cart is used to carry anything but the lightest loads, the high bending moment will over time likely cause fatigue of the threads and twisting of the bolt relative to the nut, ultimately resulting in inward toeing and contact of the wheels at their upper portions against the side wall panels.

Yet another limitation of the Wissler utility cart appears to be the arrangement by which the respective side wall panels and wheels mounted thereto are maintained in their erected vertical positions. The end wall panels must be installed at their respective front and rear positions between the side wall panels and locked in place by pins carried by the end panels. Thus, to erect the cart, each respective side wall panel and wheel must first be pivoted to the vertical position and then the respective end panels installed and locked in place. Not only is this procedure for erecting (or, conversely, for folding) the cart rather awkward to carry out, the arrangement for maintaining the cart in the erected position eliminates the possibility of using the cart without its end panels in place. This limits the cart to hauling things which will fit within its box.

A further limitation of the Wissler utility cart is that locking of the handle of the cart in sleeve sockets provided at the respective top edges of the side wall panels is only accomplished when the rear end panel is installed and locked in place. Thus, whenever the rear end panel is raised from its locking position, the handle becomes unlocked from the sockets.

Consequently, in view of the above-cited limitations present in the construction of the Wissler utility cart and their potentially adverse impact on the procedures required for converting the cart between storage and erected positions and on the structural integrity of the cart, it is readily apparent that a need still exists for an effective foldable utility cart construction which addresses both of the aforementioned problems. Such design should ensure that the materials and steps required to manufacture and assemble the cart are compatiable with existing techniques, that the structural integrity and durability of the cart are not compromised in reaching a design which facilitates easy foldable storage of the cart, and that the folding and erecting mechanism of the cart is operable in a simple, relatively automatic and reliable way.

SUMMARY OF THE INVENTION

The present invention provides a foldable utility cart construction designed to satisfy the aforementioned needs. The utility cart of the present invention (hereinafter referred to as the improved cart to distinguish discussion of it from discussion directed to the Wissler cart) incorporates features which avoid all of the above-described limitations of the Wissler utility cart by resolutely addressing and solving the twofold design problem of reliability and durability of the cart on the one hand and easy storability of the cart on the other without compromising either for the sake of the other. Furthermore, only standard materials and methods are used in the manufacture and assembly of the improved cart.

Basically, the improved foldable utility cart has (a) a hauling body formed by a floor and a pair of opposite wheel-bearing side panels; and (b) pivot means interconnecting and mounting the wheel-bearing side panels to the floor for pivotal movement of each side panel relative to the floor between an erected transport position in which the side panels together with the floor form a load supporting cavity in the body and mobilize the body and a folded storage position in which the side panels overlie the floor so as to eliminate the cavity and easily immobilize the body for storage. The pivot means is disposed outside of the load supporting cavity where it is unexposed to dirt and other matter contained therein.

More particularly, the side panels have respective wall members with lower longitudinal edges and interior sides which face one another when the side panels are in their erected positions. The floor has upturned opposite side edges which fit snugly along and in contact with the interior sides of the side panels wall members at the lower longitudinal edges thereof when the side panels are in their erected positions. By such an arrangement, the side panels and floor form generally closed longitudinal corners in the load supporting cavity of the mobilized hauling body.

Further, the improved cart has latching means disposed outside of the load supporting cavity where it also is unexposed to dirt and matter contained in the cavity. The latching means is operable, relatively automatically, for locking the wheel-bearing side panels in their erected transport positions independent of the use of end gates. Once the side panels are locked in their erected transport positions, the end gates can be mounted to and removed from the side panels at opposite ends of the load supporting cavity for closing and opening the ends of the cavity without affecting the locked erected positions of the side panels.

In particular, the latching means includes a pair of latching mechanisms disposed outside of the load supporting cavity below the floor and adjacent to the respective wheels on the side panels. Each of the wheels is rotatably mounted by an axle to the one side panel at one side thereof outside of the cavity. The axle is supported by and extends through the side panel and then inwardly under the floor so as to underlie the floor at the inner end of the axle when the side panel has pivoted to its erected transport position.

Each of the wheel axle latching mechanisms includes a latch member actuatable between unlatching and latching positions, and, preferably, spring biased to automatically assume the latching position. In the unlatching position, each latch member unlocks the axle of one wheel from the floor to allow pivoting of the side panel mounting the wheel to its folded storage position. In the latching position, each latch member locks the axle of the wheel to the floor after the side panel has pivoted to its erected transport position such that the side panel is retained in its erected position. Specifically, each latch member is rotatably mounted to the floor on an opposite side thereof from the load supporting cavity and pivotable between the latching position in which the axle inner end is engaged and locked by the latch member and the unlatching position in which the axle inner end is disengaged and unlocked from the latch member.

Still further, the wall members of the cart side panels have opposite interior and exterior sides. The interior sides of the side panel wall members together with the floor define the load supporting cavity of the mobilized hauling body when the side panels are in their erected positions. Also, each side panel has a longitudinal tube connected to and mounted along the exterior side of its wall member adjacent to the lower longitudinal edge of the wall member. The tube has a pair of opposite ends extending beyond the wall member and is rotatably mounted at its opposite ends to the respective pivot means which are attached to floor at opposite ends thereof outside of the load supporting cavity. In addition, the cart has a handle assembly mounted to the side panel tubes. The handle assembly has a pair of terminal ends adapted to interfit with and attached to the same one ends of the pairs of opposite ends of the respective tubes for adapting the hauling body for manually-powered locomotion when the body is mobilized.

From the above-summarized construction of the improved cart of the present invention, it is readily seen that the side panels and floor of the hauling body of the improved cart are not hingedly connected at their adjacent longitudinal edges as in the case of the Wissler cart where such connections are exposed to matter being hauled in the interior of the cart box. The improved cart provides pivotal connections between its floor and side panels which are located outside of, and thus unexposed to the matter contained in, the load supporting cavity defined by the floor and side panels. Further, unlike Wissler, the improved cart utilizes side panel structural support assemblies with tubes which define the pivotal axes of the side panels relative to the floor, locate the position of the handle and impart structural rigidity to the entire cart.

Also, unlike the space present along the corners in the hauling box of the Wissler cart, the load supporting cavity of the improved cart has tight corners formed by upturned opposite longitudinal edges of the cart floor. Because of the hinged connection provided between the adjacent longitudinal edges of the side and floor panels in the Wissler cart, it is not possible to upturn the opposite longitudinal edges of the floor panel nor is it readily apparent what other way can be used to close the space or gap at the corners of the box.

Unlike the weak and unreliable mounting arrangement of the wheel to the side wall panel by a threaded nut and wheel bolt connection in the Wissler cart construction, the improved cart provides a structurally sound wheel mounting and locking arrangement. In particular, a wheel axle is used to rotatably mount the wheel to the side panel and a latching mechanism is provided to lock the side panel and wheel in the erected position by latching the inner end of the wheel axle to the underside of the floor. It should now be recognized that, unlike in the case of the Wissler cart, the side panels of the improved cart can be folded and erected without the insertion and removal of end gates. The conversion of the wheel-bearing side panels of the improved cart between erected and folded positions requires the performance of the relatively simple procedure of latching or unlatching each of the latch members, which preferably are spring loaded.

Lastly, the handle assembly of the improved cart remains attached to the side panel tubes independently of the presence or absence of the rear end gate, unlike the Wissler handle which is automatically locked or unlocked by respective insertion or remove of the end gate.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is a perspective view of an improved foldable utility cart constructed in accordance with the principles of the present invention.

FIG. 2 is an enlarged side elevational view of the improved cart of FIG. 1, with the left one of the wheels omitted for the purpose of clarity.

FIG. 3 is a fragmentary sectional view of the left half of the improved cart taken along line 3—3 of FIG. 2, illustrating pivotal conversion of the left side panel and wheel combination as a unit between an erected transport position, being shown in solid line form, and a folded storage position, being shown in broken line form, but, for purpose of clarity, without the latching mechanism for locking the side panel and wheel combination in the erected position being shown at the inner end of the wheel axle below the cart floor.

FIG. 4 is a side elevational view of the left side panel support assembly of the improved cart of FIGS. 1 and 2 without the side sheet being shown, but showing an end gate support and guide channel attached to the front structural channel thereof.

FIG. 5 is an end elevational view of the middle structural channel of the left side panel support assembly seen along line 5—5 of FIG. 4 with the left wheel axle affixed to the lower end of the middle structural channel.

FIG. 6 is an enlarged fragmentary sectional view of the upper edge portion of the left side panel as taken along line 6—6 of FIG. 2.

FIG. 7 is an enlarged end elevational view as seen along line 7—7 of FIG. 2 of one of a pair of pivot defining extension plates with a bearing mounted thereto for pivotally supporting the each of the side panel support assemblies on the outer end corners of front and rear structural channels of the floor.

FIG. 8 is an enlarged fragmentary end elevational view of the latching mechanism which was omitted from FIG. 3, showing the latching mechanism locking the left wheel axle in its erected position under the middle structural channel of the floor.

FIG. 9 is a side elevational view of the latching mechanism as seen along line 9—9 of FIG. 8.

FIG. 10 is an enlarged fragmentary sectional view taken along 10—10 of FIG. 2, illustrating one of a pair of tight, substantially closed, corners formed between the respective lower longitudinal edges of the side panel sheets and the turned up longitudinal opposite side edge portions of the floor pan when the side panels are in their erected position.

FIG. 11 is a foreshortened end elevational view of the cart floor removed from the improved cart.

FIG. 12 is a fragmentary foreshortened top plan view of the cart handle assembly as seen along line 12—12 of FIG. 2.

FIG. 13 is a fragmentary side elevational view of one of a pair of forward ends of the handle assembly which are inserted into the rear ends of the respective longitudinal support assembly tubes of the cart side panels.

FIG. 14 is a side elevational view of one of a pair of end gates for closing the opposite ends of the improved cart of FIGS. 1 and 2.

FIG. 15 is an end elevational view of the end gate as seen along line 15—15 of FIG. 14.

FIG. 16 is an enlarged side elevational view of one of four end gate support and guide channels which attach to the respective forward and rearward vertical ends of the respective front and rear structural channels of the cart side panels.

FIG. 17 is a top plan view of the end gate channel with end gate installed therein as seen along line 17—17 of FIG. 4.

DETAILED DESCRIPTION OF THE INVENTION

In the following description, right hand and left hand references are determined by standing at the rear of the cart behind the handle in FIG. 1 and facing toward the cart. Also, in the following description, it is to be understood that such terms as "forward," "left," "upwardly," etc., are words of convenience and are not to be construed as limiting terms.

Referring now to the drawings, and particularly to FIGS. 1 and 2, there is shown the preferred embodiment of an improved foldable utility cart, generally designated by the numeral 20 and constructed in accordance with the principles of the present invention. The improved foldable utility cart basically includes a floor 22 and a pair of opposite wheel-bearing side panels 24 forming a hauling body. A pair of ground engagable wheels 26 are rotatably mounted to the side panels 24 for mobilizing the hauling body. A plurality of pivot means 28 disposed at respective opposite ends of the floor 22 and of the side panels 24 interconnect and mount each side panel and wheel combination as a unit to the floor 22 for pivotal movement relative to the floor 22 between an erected transport position and a folded storage position, as seen in respective solid and dashed line form in FIG. 3. In the erected transport positions of the wheel-bearing side panels 24, the floor 22 and side panels 24 together form a load supporting cavity 30 in the hauling body and the body is mobilized. On the other hand, in folded storage positions of the wheel-bearing side panels 24, the side panels 24 and wheels 26 overlie the floor 22 so as to eliminate the load supporting cavity 30 and immobilize the hauling body. Both the pivot means 28 and the wheels 26 are located outside of the load supporting cavity 30 of the cart 20. Also, the cart 20 has a handle assembly 32 attached to the side panels 24 for adapting the cart for manually-powered pushing or pulling type of locomotion when the side panels 24 and wheels 26 are in the erected transport positions.

Referring also to FIGS. 3 to 7, in addition to FIGS. 1 and 2, it is seen that each of the side panels 24 of the improved cart 20 is composed of a wall member 34 in the form of a generally rectangular sheet of metal and a structural support assembly 36 reinforcing the wall member 34 on its exterior side so as to maintain it in a flat rigid condition. As seen in FIGS. 2, 6 and 10, also the peripheral edges of the wall member 34 are folded over so as to provide additional rigidity to the member. The structural support assembly 36 includes a longitudinally extending hollow pipe or tube 38 which defines the pivotal axis of the side panel 24 and has spaced apart front, middle and rear structural channels 40,42,44 which are rigidly connected, such as by being welded, to the tube 38 and extend in transverse relation to the tube and generally parallel to one another. The tube 38 extends along the exterior of the wall member 34 just above its lower longitudinal edge 45 and through the channels 40,42,44, which at their lower ends extend below the tube 38.

The floor 22 of the cart 20 is similarly composed of a generally rectangular sheet of metal or floor pan 46 reinformed on its lower side to maintain a flat rigid condition by a series of spaced apart front, rear and middle transverse structural channels 48,50,52 which are generally aligned with the respective channels 40,42,44 of each of the side panels 24. As seen in FIG. 11, the peripheral edge portions of the floor pan 46 are also folded over so as to provide additional rigidity to the pan.

Each of the plurality of pivot means 28 which mount each side panel and wheel combination as a unit to the floor 22 for pivotal movement relative to the floor 22 is in the form of a flat extension plate 28 rigidly affixed to the outer end corners of the front and rear floor structural channels 48,52. The plates 28 mount respective bearings 54 which rotatably support the opposite front and rear ends 56,58 of the respective side panel tubes 38 outside of the load supporting cavity 30 of the cart 20. Specifically, the pivot defining extension plates 28 extend outward beyond the opposite ends of the front and rear floor channels 48,52 and overlap with the lower ends of the respective front and rear side panel channels 40,44 where they receive the opposite ends 56,58 of the tubes 38.

The respective wall members 34 of the side panels 24 at their interior sides face one another and together with the floor pan 46 define the load supporting cavity 30 when the side panels 24 are in their erected positions. Also, as seen in FIGS. 10 and 11, the floor pan 46 has upturned opposite side edges 60 which fit snugly along and in contact with the interior sides of the side panel wall members 34 at their lower longitudinal edges 45 when the side panels are in their erected positions so as to define generally closed longitudinal corners in the load supporting cavity 30. In view of the pivotal mounting of the side panels 24 at the opposite ends 56,58 of their tubes 38 by pairs of pivot extension plates 28 located outside of the cavity 30, there is nothing to obstruct the snug fit at the longitudinal corners between the floor pan 46 and the side panel wall members 34. Therefore, such unique pivot arrangement by which the side panels 24 and wheels 26 as a unit can pivot about the side edges of the floor 22 allows a tight seal or interface, as seen in FIG. 10, to be formed at the lower side corners when the side panels 24 are in their erected positions relative to the floor 22. Then, once the side panels 24 and wheels 26 have been pivoted as a unit toward their folded storage position, the side panel wall member lower edges 45 are located away from the floor opposite side edges 60 which provides access for cleaning and drying of all of the edges 45,60.

Turning also to FIGS. 8 and 9, the side panel 24 and wheels 26 are retained in their respective erected transport positions by latching means in the form of a pair of releasable latching mechanisms 62 (only one being shown in FIG. 8) disposed outside of the load supporting cavity 30 of the hauling body and below the floor 22 thereof. Each latching mechanism 62 is actuatable between unlatching and latching positions (only the latching position being seen in FIG. 8), and preferably spring loaded for providing relatively automatic latching operation. Each latching mechanism 62 is mounted to the outer opposite ends of the middle floor channel 50 and disposed adjacent one of the ground wheels 26 (for sake of clarity the mechanism is not shown in FIG. 3).

Each of the ground wheels 26 is rotatably mounted by an axle 64 which extends through and is fixed to outer and inner plate portions 66,68 of the respective lower ends of the side panel middle channels 42. Thus, the common rotational axis of the wheels 26 when the side panels 24 are erected extends across and below the cart floor 22. The latching mechanisms 62 are mounted in the middle floor channel 50 to securely couple an extension 70 of each wheel axle 64 which underlies the floor 22 to the floor channel 50 so as to lock the side panels 24 and wheels 26 therewith in their erected positions with the wheel axles 64 aligned along the common axis. The extension 70 of each wheel axle 64 reduces the moment about pivot tube 38 and thereby reduces the load on the latching mechanism 62.

More particularly, each of the latching mechanisms 62 includes a latch member 72 rotatably mounted by a shaft 74 which extends between the sides of the middle floor channel 50. The shaft 74 at one end carries a spring 75 which automatically moves the member 72 to its latching position. Thus, a lower end 76 of the latch member 72 is spring biased toward the latching position, seen in FIG. 8, in which the axle extension 70 is seated in a notch 78 defined in the latch member 72. A separate flexible member, such a braided wire 79, interconnects each latch member 72 to the middle floor channel 50 so as to stop the spring biased member 72 at its latching position of FIG. 8. By pulling on the wire 79, the latch member 72 can be manually pivoted to an unlatching position (not shown) which moves its lower end 76 counterclockwise so as to disengage the axle extension 70 from the notch 76 in the latch member 72.

Once the side panels 24 and wheels 26 are pivoted relative to the floor 22 from their folded storage positions to their erected operative or transport positions and latched (or locked) in the erected positions, a pair of end gates, one of which is seen in FIGS. 14 and 15, can be mounted to the side panels 24 at opposite ends of the load supporting cavity 30 for closing the ends of the cavity. Particularly, an end gate support and guide channel 80, seen in FIGS. 16 and 17, can be mounted to the front and rear sides of the respective front and rear side panel channels 40,44 (one being shown on the front channel in FIG. 4) above the location of the pivotal extension plates 28. As seen in fragmentary form in FIG. 17, an end gate 78 can then be inserted into and between each pair of the guides channels 80 to a resting position on the front and rear edges 82,84 of the floor pan 46 which extend beyond the wall members 34 of the side panels 24, as seen in FIG. 2.

Turning to FIGS. 12 and 13, in addition to FIGS. 1 and 2, it is seen that the handle assembly 32 of the improved cart 20 has a pair of tubular members 85 with terminal ends 86 adapted to insert within and attached to the rear ends 58 of the side panel tubes 38. The tubular members 85 also have respective bent hand grip ends 88 opposite their terminal ends 86 and are rotatably interconnected by a cross member 90. Upon rotation of the pivot tubes 38 and side panels 24, the bent hand grip ends 88 are automatically converted between storage orientations, shown in solid line form in FIG. 2, in which the bent ends 88 extend in a common plane and operational orientations, seen in dashed line form in FIG. 2, in which the bent ends 33 extend in generally parallel planes.

To make the improved cart 20 freestanding, a pair of generally U-shaped ground support brackets 92 are fixed to the lower ends of the front and middle side panel channels 40,42 so as to contact the ground with a large footprint rearwardly of the wheels 26. In view that the brackets 92 are fixed to the side panels 24, they pivot with the side panels along with the ground wheels 26.

Finally, plastic semi-spherical end caps (not shown) can be inserted on ends 56 of the pivot tube 38 to facilitate sliding of the cart 20 in its folded storage position.

It is thought that the improved foldable utility cart of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A foldable utility cart, comprising:
   (a) a floor;
   (b) a pair of opposite side panels;
   (c) pivot means interconnecting and mounting said side panels to said floor for pivotal movement of each of said side panels relative to said floor between an erected transport position in which said side panels together with said floor form a load supporting cavity and a folded storage position in which said side panels overlie said floor so as to eliminate said cavity, said pivot means being disposed outside of said load supporting cavity where said pivot means is unexposed to matter contained therein;
   (d) a pair of ground engagable wheels;
   (e) a pair of axle means attached to said respective side panels and rotatably mounting said ground wheels on said respective side panels at respective sides thereof opposite to said floor and outside of said load supporting cavity such that said ground wheels are movable as a unit with said side panels between said erected transport positions and said folded storage positions; and
   (f) a pair of latching means disposed outside of said load supporting cavity below said floor and adjacent said respective wheels, each of said latching means being actuatable between unlatching and latching positions for respectively unlocking one of said wheels from said floor to allow pivoting of said side panel mounting said wheel to its folded storage position and locking said one wheel to said floor when said side panel has pivoted to its erected transport position such that said side panel is retained in its erected position;
   (g) each said axle means extending transversely of its respective one side panel and away from a side thereof adjacent to said floor so as to underlie said floor at an inner end of said axle means when said side panel has pivoted to its erected transport portion;
   (h) each said latching means including a latch member movably mounted to said floor on an opposite side thereof from said load supporting cavity and movable between said latching position in which a respective one of said axle means inner ends is engaged by said latch member and said unlatching position in which said one axle means inner end is disengaged from said latch member.

2. The utility cart as recited in claim 1, wherein:
said side panels have respective wall members with lower longitudinal edges and interior sides facing one another; and said floor has upturned opposite side edges which fit snugly along and in contact with said wall member interior sides at said lower longitudinal edges of said side panels when said side panels are in their erected positions so as to define generally closed longitudinal corners in said load supporting cavity.

3. The utility cart as recited in claim 1, further comprising:
a pair of end gates mountable to said side panels at opposite ends of said load supporting cavity, after said wheels and side panels are locked in said erected transport positions, for closing said ends of said cavity.

4. The utility cart as recited in claim 1, wherein each of said side panels includes:
a wall member having opposite interior and exterior sides, said interior sides of said side panel wall members together with said floor defining said load supporting cavity when said side panels are in their erected positions; and
a longitudinal tube connected to and mounted along said exterior side of said wall member of said each side panel adjacent to a lower longitudinal edge of said wall member, said tube having a pair of opposite ends extending beyond said wall member and being rotatably mounted to said pivot means.

5. The utility cart as recited in claim 4, further comprising:
a handle assembly having a pair of terminal ends adapted to interfit with and attached to the same one ends of said pairs of opposite ends of said respective tubes for adapting said cart for manually-powered locomotion when said side panels and wheels are in said erected transport positions.

6. The utility cart as recited in claim 5, wherein said handle assembly has a pair of bent hand grip ends opposite its terminal ends, said bent hand grip ends being convertable between storage orientations in which said bent ends extend in a common plane and operational orientations in which said bent ends extend in generally parallel planes.

7. A foldable utility cart, comprising:
   (a) a floor;
   (b) a pair of opposite side panels;
   (c) pivot means interconnecting and mounting said side panels to said floor for pivotal movement of each of said side panels relative to said floor between an erected transport position in which said side panels together with said floor form a load supporting cavity and a folded storage position in which said side panels overlie said floor so as to eliminate said cavity;
   (d) a pair of ground engagable wheels;

(e) axle means attached to said respective side panels and rotatably mounting said ground wheels on said respective side panels outside of said load supporting cavity such that said ground wheels are movable as a unit with said side panels between said erected transport positions and said folded storage positions; and (f) latching means disposed outside of said load supporting cavity and below said floor for simultaneously locking said wheels via said axle means to said floor as said side panels and wheels therewith pivot and reach their said erected transport positions such that said side panels and wheels are retained in said erected positions;

(g) said each side panel including
 (i) a wall member having opposite interior and exterior sides, said interior sides of said side panel wall members together with said floor defining said load supporting cavity when said side panels are in their erected positions, and
 (ii) a longitudinal tube connected to and mounted along said exterior side of said wall member of said each side panel adjacent to a lower longitudinal edge of said wall member, said tube having a pair of opposite ends extending beyond said wall member and being rotatably mounted to said pivot means.

8. The utility cart as recited in claim 7, wherein said latching means includes:
a pair of latching mechanisms disposed outside of said load supporting cavity below said floor and adjacent said respective wheels, each of said latching means being actuatable between unlatching and latching positions for respectively unlocking one of said wheels via said axle means from said floor to allow pivoting of said side panel mounting said wheel to its folded storage position and locking said one wheel via said axle means to said floor when said side panel has pivoted to its erected transport position such that said side panel is retained in its erected position.

9. The utility cart as recited in claim 8, wherein:
said axle means includes a pair of axles attached to said respective side panels and which extend in transverse relationship to said respective side panels and away from a side thereof adjacent to said floor so as to underlie said floor at an inner end of said each axle when said side panel has pivoted to its erected transport portion; and
each of said latching mechanisms includes a latch member movably mounted to said floor on an opposite side thereof from said load supporting cavity and movable between said latching position in which one of said respective axle inner ends is engaged by said latch member and said unlatching position in which said one axle inner end is disengaged from said latch member.

10. The utility cart as recited in claim 7, wherein:
said floor has upturned opposite side edges which fit snugly along and in contact with said wall member interior sides at said lower longitudinal edges of said side panels when said side panels are in their erected positions so as to define generally closed longitudinal corners in said load supporting cavity.

11. The utility cart as recited in claim 7, further comprising:
a pair of end gates mountable to said side panels at opposite ends of said load supporting cavity, after said side panels are locked in said erected transport positions, for closing said ends of said cavity.

12. The utility cart as recited in claim 7, further comprising:
a handle assembly having a pair of terminal ends adapted to interfit with and attached to the same one ends of said pairs of opposite ends of said respective tubes for adapting said hauling body for manually-powered locomotion.

13. The utility cart as recited in claim 12, wherein said handle assembly has a pair of bent hand grip ends opposite its terminal ends, said bent hand grip ends being convertable between storage orientations in which said bent ends extend in a common plane and operational orientations in which said bent ends extend in generally parallel planes.

* * * * *